United States Patent
Lin et al.

(10) Patent No.: US 10,271,678 B1
(45) Date of Patent: Apr. 30, 2019

(54) CUP SLEEVE STRUCTURE WITH HANGING EARS

(71) Applicant: BE RICH LIMITED, New Taipei (TW)

(72) Inventors: Hsien-Jen Lin, New Taipei (TW); Tzu-Chi Lin, New Taipei (TW)

(73) Assignee: BE RICH LIMITED, New Tiapei (TW)

( * ) Notice: Subject to any disclaimer, the term of this patent is extended or adjusted under 35 U.S.C. 154(b) by 0 days.

(21) Appl. No.: 16/004,777

(22) Filed: Jun. 11, 2018

(30) Foreign Application Priority Data

Jan. 8, 2018 (TW) .............................. 107100698 A (51) Int. Cl.
*A47J 31/06* (2006.01)
*A47J 31/44* (2006.01)

(52) U.S. Cl.
CPC ......... *A47J 31/446* (2013.01); *A47J 31/0626* (2013.01)

(58) Field of Classification Search
USPC .......................................................... 248/94
See application file for complete search history.

(56) References Cited

U.S. PATENT DOCUMENTS

| | | | | | |
|---|---|---|---|---|---|
| 2,835,191 | A | * | 5/1958 | Clurman | A47J 31/02 141/342 |
| 3,567,033 | A | * | 3/1971 | Whelan | B01D 29/085 210/497.2 |
| 3,811,373 | A | * | 5/1974 | Telco | B65D 85/8043 99/295 |
| 4,220,541 | A | * | 9/1980 | Chang | A47J 31/08 210/474 |
| 4,221,670 | A | * | 9/1980 | Ziemek | A47J 31/0626 210/474 |
| 4,271,024 | A | * | 6/1981 | Kawolics | A47J 31/446 210/474 |
| 4,519,911 | A | * | 5/1985 | Shimizu | A47J 31/02 210/478 |
| 4,560,475 | A | * | 12/1985 | Kataoka | B65D 85/8043 210/249 |
| D286,006 | S | * | 10/1986 | Kataoka | D7/400 |
| 4,863,601 | A | * | 9/1989 | Wittekind | A47J 31/02 210/474 |
| 5,059,325 | A | * | 10/1991 | Iida | A47J 31/02 210/474 |
| 5,532,168 | A | * | 7/1996 | Marantz | C12M 45/02 210/473 |
| 5,536,393 | A | * | 7/1996 | Weeks | A47J 31/446 210/232 |
| 5,569,377 | A | * | 10/1996 | Hashimoto | B01D 29/085 210/238 |

(Continued)

*Primary Examiner* — Monica E Millner
(74) *Attorney, Agent, or Firm* — Juan Carlos A. Marquez; Marquez IP Law Office, PLLC (57) ABSTRACT

This invention relates to a cup sleeve structure with hanging ears, which comprises a cup sleeve which has an annular wall body having a top opening and bottom opening on the two sides of the annular wall body, and at least two hanging ears, which can be bent and combined to the outer surface of the annular wall. By the implementation of the present invention, the cup sleeve structure having hanging ears can completely take up the least space while being stored, and can also be conveniently carried, and can support the filter cup body in use.

10 Claims, 7 Drawing Sheets

(56) References Cited

U.S. PATENT DOCUMENTS

| | | | | |
|---|---|---|---|---|
| 5,605,710 | A * | 2/1997 | Pridonoff | A47J 31/02 206/0.5 |
| 5,736,042 | A * | 4/1998 | Aoki | A47J 31/02 210/474 |
| 5,771,777 | A * | 6/1998 | Davis | A47J 31/02 99/279 |
| 5,865,094 | A * | 2/1999 | Kealy | A47J 31/007 141/106 |
| 6,079,318 | A * | 6/2000 | Davis | A47J 31/005 99/279 |
| 6,189,438 | B1 * | 2/2001 | Bielfeldt | A47J 31/08 210/493.5 |
| 6,752,275 | B2 * | 6/2004 | Sakamoto | A47J 31/02 210/455 |
| 7,235,272 | B2 * | 6/2007 | Saitoh | A47J 31/02 426/77 |
| 8,746,131 | B2 * | 6/2014 | Saitoh | A47J 31/005 210/474 |
| D717,109 | S * | 11/2014 | Simontov | D7/396.2 |
| 9,776,763 | B2 * | 10/2017 | Gerson | B01D 29/085 |
| 2018/0178973 | A1 * | 6/2018 | Kaiserman | B65D 85/8043 |

* cited by examiner

FIG. 4B

CUP SLEEVE STRUCTURE WITH HANGING EARS

BACKGROUND OF THE INVENTION

1. Technical Field

The present invention relates to a cup sleeve structure with hanging ears. More particularly, the invention relates to a cup sleeve structure having hanging ears and configured to support a filter cup or filter screen for beverage preparation.

2. Description of Related Art

The development of the global consumer market has given rise to the rapid growth of a great variety of beverage markets, some notable examples of which are the coffee, tea, floral tea, fruit tea, and Chinese herbal tea markets. Coffee, for instance, has gradually become indispensable to many people's daily lives because caffeine can stimulate the central nervous system to help keep a clear head, increase work efficiency, and enhance concentration and responsiveness for a limited period. Caffeine also leads to vasoconstriction and hence can be used to treat headaches attributable to dilated blood vessels.

The conventional paper filter cups for coffee preparation have a V-shaped filter structure and therefore must be used in conjunction with a V-shaped filter holder. It is inconvenient, however, to carry such filter holders around. Moreover, the V-shaped structure of the conventional paper filter cups tends to cause over-compression of the ground coffee being infused; that is to say, the coffee granules cannot loosen up effectively. In light of the above, screen-based filter cups were developed.

Screen-based filter cups do not result in over-compression of the coffee granules being infused as do V-shaped paper filter cups, but other issues arise. During the coffee brewing process, in which hot water (about 95° C.) is generally used, a coffee cup is needed to receive the brewed coffee, so it is required that a screen-based filter cup be able to sit on a coffee cup during the brewing process.

BRIEF SUMMARY OF THE INVENTION

The present invention provides a cup sleeve structure having hanging ears. The cup sleeve structure is intended to be space-efficient, economical, user-friendly, and able to support a screen-based filter cup effectively so that the filter cup can be used with ease.

Implementation of the present invention at least produces the following advantageous effect:

1. A screen-based filter cup can be effectively supported to facilitate the preparation of such beverages as coffee and floral tea.

2. The disclosed cup sleeve structure can be folded up to minimize the space occupied and thereby facilitate stacking and storage.

3. The disclosed cup sleeve structure is highly portable and can be carried and used wherever desired.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

DETAILED DESCRIPTION OF THE INVENTION

Figure 1:
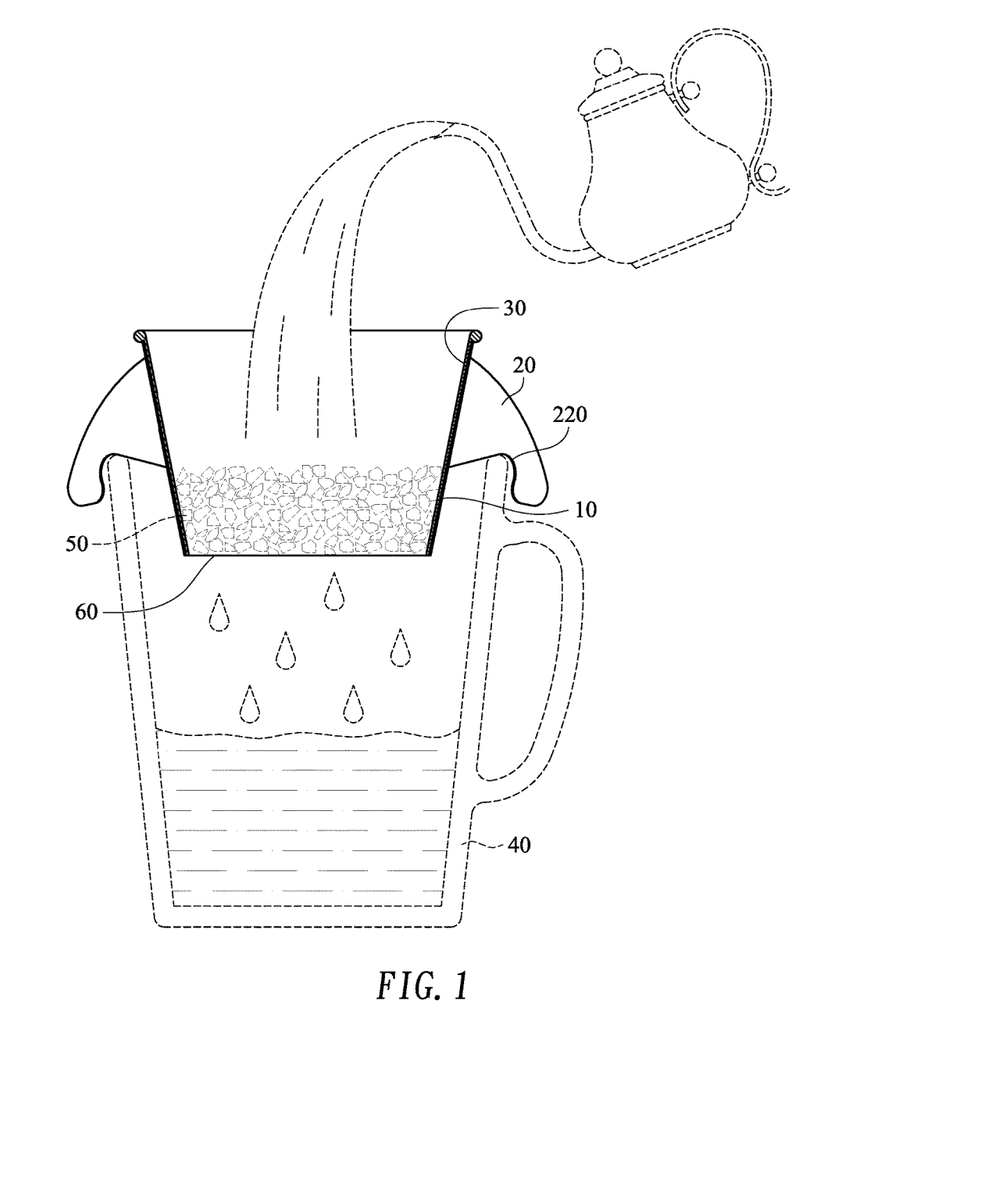
FIG. 1 shows an example of how an embodiment of the disclosed cup sleeve structure with hanging ears is used.

Referring to FIG. 1 for an embodiment of the present invention, a cup sleeve structure 100 with hanging ears includes a cup sleeve 10 and at least two hanging ears 20. The cup sleeve 10 can be mounted around a screen-based filter cup 30 and then have its hanging ears 20 hung on the rim of a receiving cup 40 so that the screen-based filter cup 30 can be used to prepare a beverage 50 (e.g., coffee or tea) conveniently.

Figure 2A:
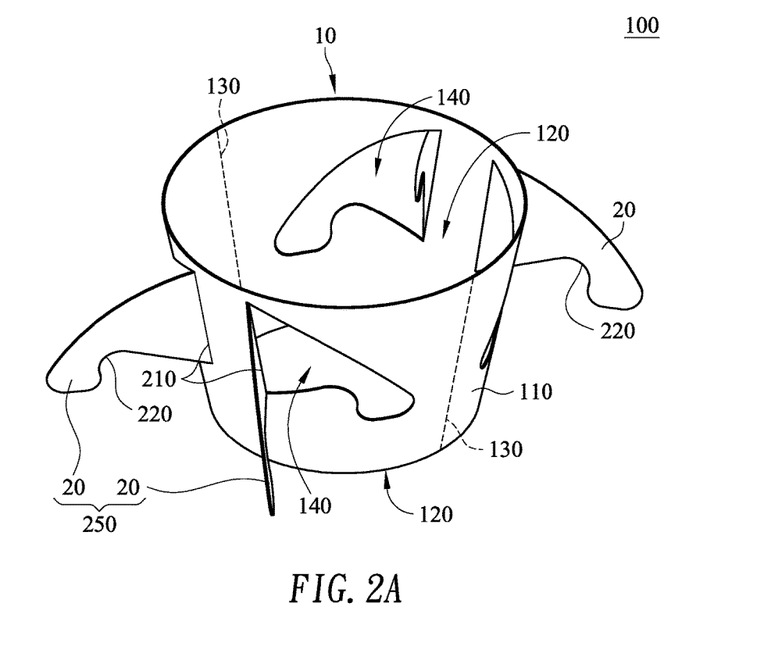
FIG. 2A is a perspective view of the cup sleeve structure in FIG. 1.
Figure 2B:
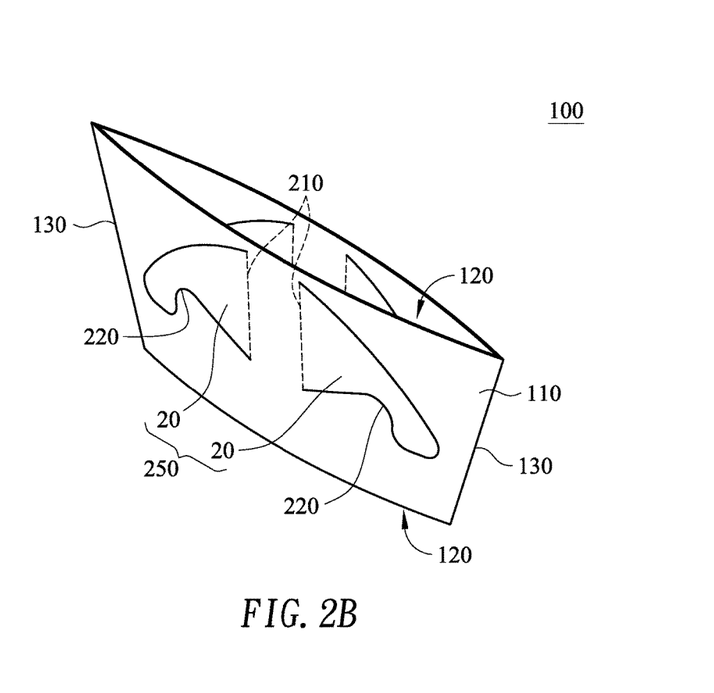
FIG. 2B is a perspective view showing the cup sleeve structure in FIG. 2A in a folded state.
Figure 3A:
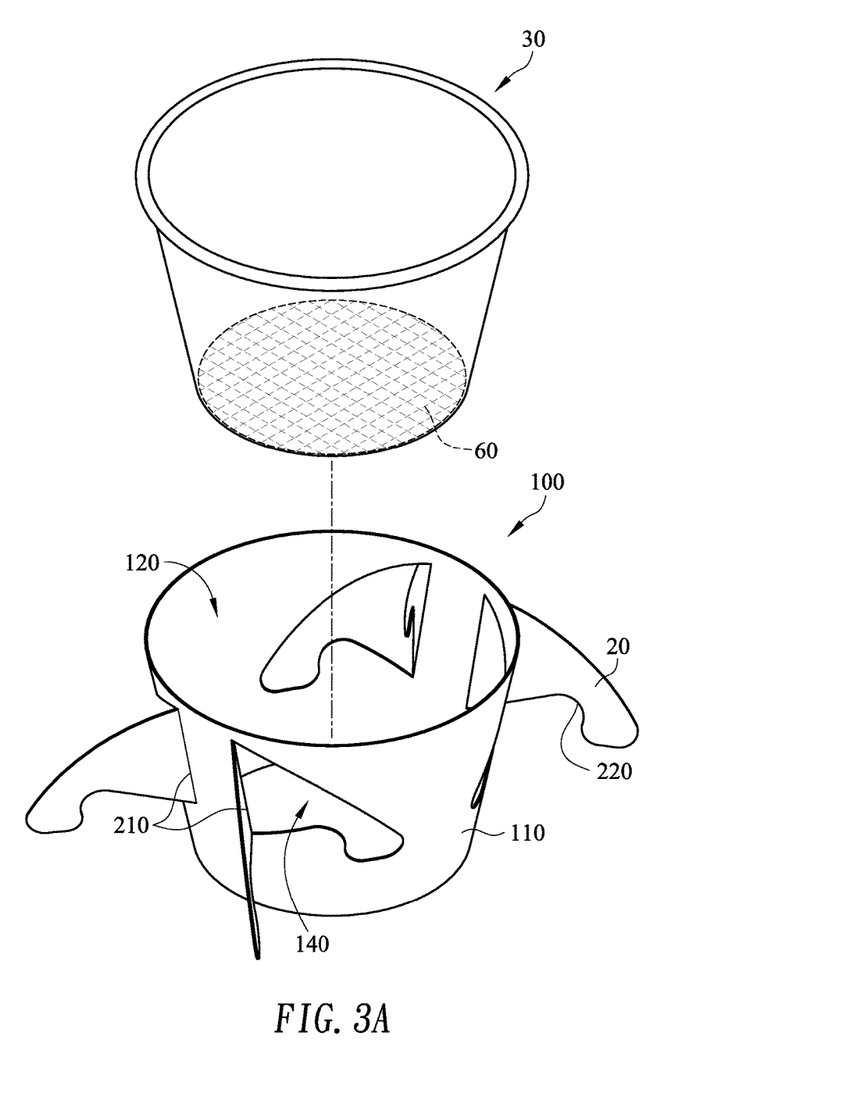
FIG. 3A is a perspective view showing the cup sleeve structure in FIG. 2A and a screen-based filter cup to be fitted therein.
Figure 3B:
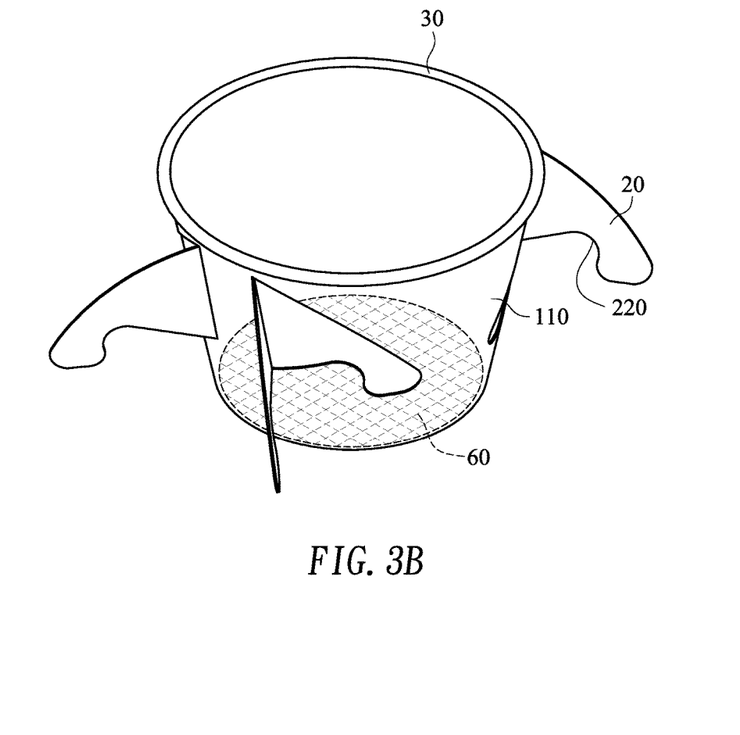
FIG. 3B is an assembled perspective view of the cup sleeve structure and the screen-based filter cup in FIG. 3A.
Figure 4A:
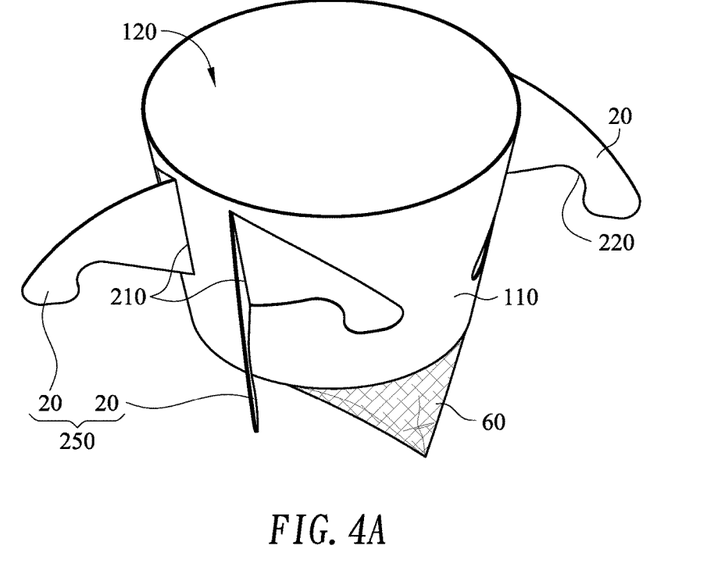
FIG. 4A is a perspective view of another embodiment of the disclosed cup sleeve structure with hanging ears, wherein the cup sleeve structure incorporates a filter screen.
Figure 4B:
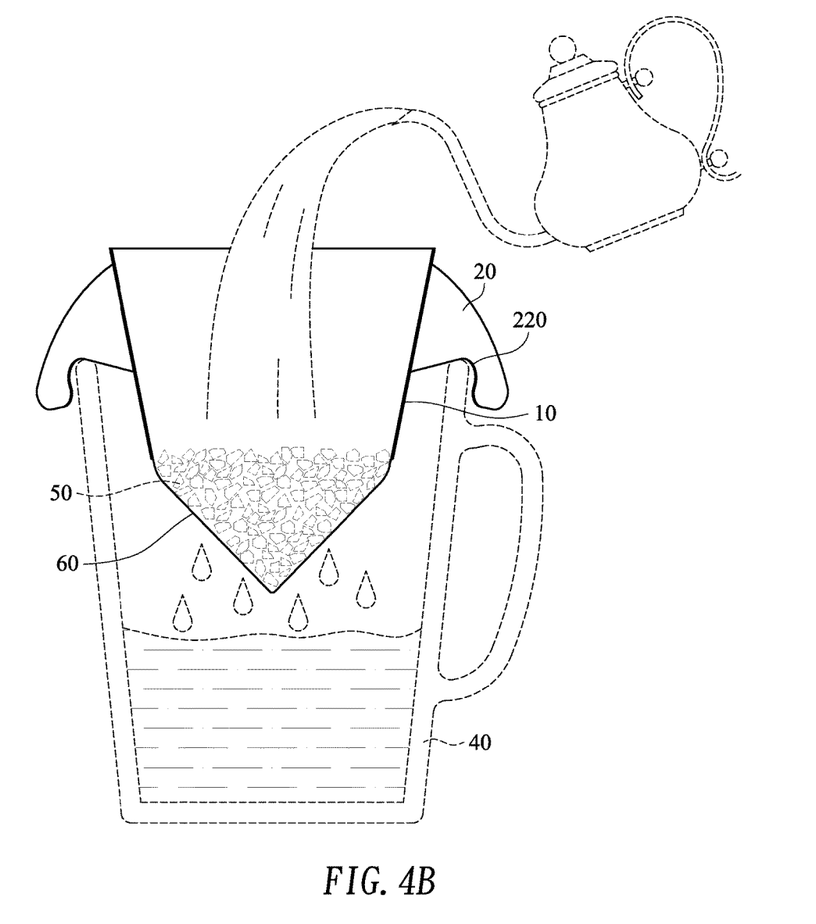
FIG. 4B shows how the cup sleeve structure in FIG. 4A is used.

The cup sleeve 10 has an annular wall 110, and the top and bottom ends of the annular wall 110 are each formed with an opening 120 to allow the cup sleeve 10 to be mounted around and support the screen-based filter cup 30. The annular wall 110 may have at least two corresponding cup sleeve folding portions 130 so that, once manufactured and ready for packaging, the cup sleeve 10 can be rendered into a flat configuration through the cup sleeve folding portions 130. This makes it possible to stack a plurality of cup sleeves 10 together to save space. The flat configuration facilitates not only packaging but also transportation and storage.

The annular wall 110 can be made of cardboard, a plastic sheet, or a polylactide (PLA) sheet. When the annular wall 110 is made of cardboard, one or both of the inner and outer surfaces of the annular wall 110 may have a polypropylene (PP), polyethylene (PE), polyethylene terephthalate (PET), or PLA coating to make the cardboard impervious to liquid and also help protect the cardboard from contamination.

The at least two hanging ears 20 are coupled to the outer surface of the annular wall 110 in a foldable manner. Each hanging ear 20 has a proximal end perpendicularly connected to the annular wall 110, and to make it easier to fold the hanging ears 20 into an outwardly extended configuration and a storage configuration, there may be a vertically foldable portion 210 at the perpendicularly connected junction of each hanging ear 20 and the annular wall 110.

To facilitate storage, the contour of each hanging ear 20 matches the contour of a corresponding receiving groove or opening 140 in the annular wall 110 so that each hanging ear 20 can be fitted in the corresponding receiving groove 140 in a removable manner. More specifically, each hanging ear 20 is fitted in the corresponding receiving groove 140 while in the storage configuration and can be removed from the corresponding receiving groove 140 and rendered into the outwardly extended configuration in order to be used.

To prevent the hanging ears 20 from sliding off after they are hung on the rim of the receiving cup 40, each hanging ear 20 is formed with a hanging hook portion 220 adjacent to its distal end. The hanging hook portions 220 allow the hanging ears 20 to hang securely on the rim of the receiving cup 40. If there are only two hanging ears 20, the two hanging ears 20 may be arranged 180° apart from each other so as to be well balanced while hung on the rim of the receiving cup 40.

If the cup sleeve 10 needs to be hung or supported more stably, the annular wall 110 may be provided with two hanging ear units 250, wherein each hanging ear unit 250 includes two hanging ears 20. In that case, a total of four hanging ears 20 can be used for support. The two hanging ear units 250 may also be arranged 180° apart from each other so as to be well balanced while hung on the rim of the receiving cup 40.

The cup sleeve 10 described above is so designed that the screen-based filter cup 30 can be fitted in the space surrounded by the annular wall 110; nevertheless, it is also feasible to have a filter screen 60 coupled directly to the bottom end of the annular wall 110 of the cup sleeve 10. The latter configuration provides as much convenience of use.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A cup sleeve structure with hanging ears, comprising:
    a cup sleeve having an annular wall, wherein the annular wall has a top opening and a bottom opening; and
    at least two said hanging ears, wherein each said hanging ear has a proximal end, the proximal end of each said hanging ear is connected to the annular wall and has a vertically foldable portion connected to an outer surface of the annular wall in a foldable manner, and each said hanging ear has a distal end and is formed with a hanging hook portion adjacent to the distal end;
    wherein the contour of each said hanging ear matches the contour of a corresponding receiving groove or opening in the annular wall so that each said hanging ear can be fitted in the corresponding receiving groove in a removable manner, more specifically, each said hanging ear is fitted in the corresponding receiving groove while in the storage configuration and can be removed from the corresponding receiving groove and rendered into the outwardly extended configuration in order to be used.

2. The cup sleeve structure of claim 1, wherein the annular wall has at least two corresponding cup sleeve folding portions.

3. The cup sleeve structure of claim 1, wherein the annular wall is made of one of cardboard, a plastic sheet, and a polylactide (PLA) sheet.

4. The cup sleeve structure of claim 1, wherein the annular wall is made of cardboard and has an inner surface and an outer surface, and one or both of the inner surface and the outer surface of the annular wall have a coating.

5. The cup sleeve structure of claim 1, wherein each said hanging ear has a contour matching a contour of a corresponding receiving groove in the annular wall, and each said hanging ear is removably fitted in the corresponding receiving groove.

6. The cup sleeve structure of claim 1, wherein there are two said hanging ears, and the two hanging ears are 180° apart from each other.

7. The cup sleeve structure of claim 1, wherein the annular wall is provided with two hanging ear units, and each said hanging ear unit includes two said hanging ears.

8. The cup sleeve structure of claim 7, wherein the two hanging ear units are 180° apart from each other.

9. The cup sleeve structure of claim 1, wherein the annular wall has a bottom end provided with a filter screen.

10. The cup sleeve structure of claim 1, wherein the annular wall surrounds a space in which a screen-based filter cup is able to be fitted.

* * * * *